United States Patent [19]

Blanch et al.

[11] 4,124,459
[45] Nov. 7, 1978

[54] PROCESS FOR REMOVING MERCURY FROM BRINE SLUDGES

[75] Inventors: Julian E. Blanch, Stamford, Conn.; Helmut W. Majewski, New York, N.Y.

[73] Assignee: Stauffer Chemical Company, Westport, Conn.

[21] Appl. No.: 817,763

[22] Filed: Jul. 21, 1977

[51] Int. Cl.² ............................ C25B 1/26; C25B 1/36
[52] U.S. Cl. .................................. 204/99; 204/105 R; 204/128; 75/101 BE; 423/99; 423/103
[58] Field of Search ................... 204/105 R, 128, 99; 75/101 BE; 423/99, 101, 103, 100

[56] References Cited

U.S. PATENT DOCUMENTS

| 1,293,863 | 2/1919 | Morton | 423/103 |
|---|---|---|---|
| 3,536,597 | 10/1970 | Yamori et al. | 204/99 |
| 3,691,037 | 9/1972 | Updyke | 204/99 |
| 3,801,480 | 4/1974 | Krieg | 204/99 |
| 4,012,297 | 3/1977 | Balko et al. | 204/99 |

Primary Examiner—R. L. Andrews
Attorney, Agent, or Firm—Roger S. Benjamin

[57] ABSTRACT

The mercury content of electrolysis cell brine sludge is reduced by sequentially: (1) acidifying the sludge to a pH below 2.5 and (2) leaching the sludge with aqueous hypochlorite solvent. The mercury content removed from the sludge may optionally be isolated from the solvent and reused as mercury cathode for brine electrolysis.

19 Claims, No Drawings

PROCESS FOR REMOVING MERCURY FROM BRINE SLUDGES

BACKGROUND OF THE INVENTION

Ecologically and economically it is important to prevent loss of mercury from industrial processes. Operation of mercury cathode alkali-chlorine brine electrolysis cells is a significant source of inductrial mercury consumption. Mercury solubilized in the depleted cell brine is normally returned to the electrolysis cell. However, some mercury escapes from the electrolysis process cycle when insoluble waste products designated "sludge" are purged from the electrolysis operation.

Sludge may originate in the cell brine or the cell apparatus. It is particularly troublesome to remove mercury contained in sludges associated with perification or resaturation of the brine because the mercury is often contained in insoluble form at levels below 100 parts per million.

U.S. Pat. No. 3,600,285 describes a carbon sorption process for removing mercury solubilized in electrolysis cell brine. The patent describes reuse of recovered mercury in the electrolysis cell but cautions that recovered mercury be reintroduced to the cell after brine alkalization because mercury may be lost in the alkalizing mud.

U.S. Pat. No. 1,637,481 taught the recovery of mercury from cinnabar ore by slightly acidifying a paste of the ore to destroy basicity prior to reaction with hypochlorite and a metal.

Mercury removal from ores by leaching with aqueous hypochlorite solvent is described in numerous references. For example, G. A. Parks and N. A. Fittinghoff's "Mercury Extraction Now Possible Via Hypochlorite Leaching", E/MJ, June 1970, Pages 107–109, and U.S. Pat. No. 3,627,482 to R. S. Olson et al. describe the desirability of avoiding highly acidic leaching solutions because of corrosion and the relative instability of the hypochlorite ion.

The isolation of solubilized mercury may be accomplished by a variety of techniques such as precipitation, adsorption, or electrolysis as described in U.S. Pat. No. 3,476,552 issued Nov. 4, 1969.

THE INVENTION

This invention is a process of removing or reducing the mercury content of brine sludges originating from mercury cathode alkali-chlorine brine electrolysis cell operation.

This invention is also a process for recovering and concentrating the mercury content of mercury cathode brine electrolysis cell sludge.

Moreover, this invention is an improved process for making chlorine and alkali-metal amalgam wherein mercury lost in sludge is recovered and returned to replenish the mercury cathode of a brine electrolysis cell.

This invention is practiced by subjecting brine cell sludge to the essential steps of (1) acidifying the sludge to a pH below 2.5, then (2) leaching the sludge with aqueous hypochlorite solvent.

Unexpectedly, it has been found that by acidifying mercury containing cell sludge prior to hypochlorite leaching the mercury content may be reduced to levels below 0.75 part per million based on the weight of sludge wet cake after leaching.

The process steps of acidification and leaching may be supplemented by any of the additional steps of isolating the mercury content in the leaching solvent, separating the isolated mercury from the solvent, and returning the separated mercury to the cathode of a brine electrolysis cell.

DETAILED DESCRIPTION OF THE INVENTION

Mercury cathode electrolysis cell brine "sludge" is a brine insoluble waste product originating from a variety of sources in mercury cathode brine electrolysis cell operations. Clarifier sludge and saturator sludge comprise the most important types of sludges. Clarifier sludge is a precipitate formed when alkali-metal carbonate or hydroxide (e.g., sodium carbonate and/or sodium hydroxide) is added to brine to precipitate unwanted metal ions. Saturator sludge is a residue resulting from reconcentration of depleted brine by dissolving solid alkali-metal chlorides (e.g., sodium chloride). Sludges may also arise from other process related apparatus or operations such as cell box washings, filter backwashes, or solids contained in purge streams. Sludge of different types may be combined. Optionally, sludges may be concentrated in settling ponds to increase solids or mercury content.

Sludge is a mixture of particulate solids and brine, and its consistency may vary from a fluid slurry to a paste. Normally, the substantial part of sludge mercury content is brine insoluble and associated with the solids' portion of the sludge. A minor amount of mercury in the sludge is in the form of soluble salts normally associated with the brine.

The word "mercury" refers to any compound, complex, or elemental form of mercury. The "mercury content" of the sludge is the weight proportion of mercury (calculated as metallic mercury) based on the weight of sludge wet cake. "Wet cake" is the filter retained solids obtained by filtration of sludge on filter paper until substantially all free liquid is released.

Mercury occurs in sludge in minor concentrations, usually within the range of 10 to 1500 parts per million by weight of sludge wet cake. Typically, the mercury concentration in sludge is between 10 to 100 parts per million, although settled sludges may accumulate much higher mercury concentrations (e.g., up to 3000 ppm.). The process of the invention finds particular advantage in reducing the mercury content of clarifier and saturator sludge containing 10 to 100 parts per million mercury. The process of this invention can reduce the mercury content of sludge below 0.75 part per million mercury based on the weight of sludge wet cake after the steps of acidification and leaching.

Cell sludge is acidified by mixing with sufficient acid to obtain a pH below 2.5. Preferably, the sludge is admixed with sufficient acid to achieve a pH between 0 and 2.2 Acidification may be accomplished with any strong acid such as nitric acid, sulfuric acid; or hydrochloric acid. Hydrochloric acid is the preferred acidifying agent. Waste by-product hydrochloric acid is particularly well-suited for sludge treatment.

Sludges which contain acid reactive materials require correspondingly greater amounts of acid to achieve a pH below 2.5. For example, clarifier sludge containing a high proportion of precipitated carbonates must be reacted with sufficient acid to decompose the carbonates before the required pH level can be achieved.

After the acidification step is completed, the cell sludge is leached with aqueous hypochlorite solvent. The leaching operation is an extraction of the sludge solids to yield a mercury depleted leached sludge and a mercury enriched solvent extract. Examples of suitable hypochlorites useful as aqueous solvents are hypochlorous acid and the alkali-metal or alkaline-earth-metal hypochlorite salts such as sodium hypochlorite, potassium hypochlorite, and calcium hypochlorite. These hypochlorite agents are prepared by methods well-known in the art, for example, by addition of chlorine to water or chlorine to water solutions of sodium hydroxide or calcium hydroxide.

Since hypochlorites are more stable in neutral or basic solutions, it is desirable to maintain the pH of hypochlorite solutions at above moderately acidic pH levels, specifically above pH 5. More desirably, the pH of the hypochlorite solvent should be between pH 6 to 8. The pH of the hypochlorite solvent refers to the pH of the total combined volume of hypochlorite solvent after contact with the acidified sludge. For some applications, the initial pH of the solvent (before contact with the sludge) may be highly alkaline (e.g., pH 9 to 13) to neutralize acid contained in the sludge and give a final pH above 5.

The leaching operation may be conducted by passing the hypochlorite solvent through a stationary bed of cell sludge, or alternately the sludge may be dispersed throughout the hypochlorite solvent by agitation. Leaching may be either intermittent or continuous.

The quantity of hypochlorite solvent employed in the leaching operation should be at least sufficient to solubilize the sludge mercury content, presumably as the soluble chloride species $HgCl_4^{-2}$. The hypochlorite solvent typically is employed in considerable excess because it is susceptible to decomposition from a variety of causes. Hypochlorite employed at over 100 times the amount sufficient to solubilize the mercury content of the sludge is preferred practice. The concentration of hypochlorite in the solvent is not critical; however, aqueous solutions of hypochlorite solvent having hypochlorite concentrations of from 0.1 to 30.0 weight percent are generally suitable for leaching sludge. It is particularly advantageous to use as solvent waste hypochlorite cell liquor having a hypochlorite concentration of approximately 15 weight percent.

The volume ratio of sludge solids to hypochlorite solvent is not critical, although convenient operation will generally require a ratio of at least 2:1 and preferably from about 4:1 to 1000:1. Time for leaching may vary within wide limits but will usually be between 5 minutes and 24 hours. Temperature of the leaching operation does not significantly affect process results; however, convenient operation will usually be at near ambient temperatures. The sequential steps of acidification and leaching may be repeated if desired.

The mercury depleted sludge resulting from the two-step process of this invention may be disposed of in a conventional manner such as landfill.

The conclusion of the process may be determined by analytical methods capable of determining the mercury content of the sludge (e.g., colorimetric determination with dithizone, atomic adsorption spectroscopy).

The preceding description of the acidification and hypochlorite leaching steps constitute one embodiment of the invention. This embodiment is suitable where the principle object is to reduce the mercury content of electrolysis cell sludge to facilitate its safe disposal.

Another embodiment of the invention is to recover and concentrate the soluble mercury content of used hypochlorite solvent resulting from leaching the sludge with hypochlorite.

Recovery and concentration is accomplished by treating the hypochlorite solvent by means which will isolate its mercury content. Most often, the mercury content of used hypochlorite solvent is isolated by physical or chemical methods which render the mercury content insoluble in the solvent.

A wide variety of methods are suitable for the isolation of mercury from the hypochlorite leachate. Among the most suitable methods are (1) sorption on materials such as activated carbon, milk proteins, xanthates, keratin, scrap rubber, hair, or ion-exchange resins; (2) electrolytic deposition; (3) metal replacement; (4) amalgamation; (5) oxidation; and (6) sulfidation.

The mercury isolated from the hypochlorite solvent may then be separated from the body of solvent by methods such as filtration or decantation.

Another embodiment of this invention is to reuse the mercury recovered from the sludge in the mercury cathode of a brine electrolysis cell. A preferred embodiment of the invention is to incorporate the sequential steps of acidification, hypochlorite leaching, and mercury isolation as part of a method of electrolyzing brine to give elemental chlorine and sodium amalgam. Brine sludge purged from an electrolysis cell is treated by acidification and hypochlorite leaching to remove substantially all of the mercury content of the sludge as soluble mercury in the hypochlorite solvent. The solvent is treated to isolate its mercury content, and the isolated mercury is converted to a form suitable for reintroduction to a mercury cathode brine electrolysis cell.

The form of mercury most convenient for reintroduction to the mercury cathode is metallic mercury, although chloride of mercury may also be used. The mercury isolated from the hypochlorite solvent may be in the form of an oxide, sulfide, amalgam, adsorbed cation, or complex. The isolated mercury may be converted to forms of mercury suitable for mercury cathode introduction by known methods. For example, mercury oxides and sulfides may be roasted to give metallic mercury.

The process of this invention may be performed in either a batch or continuous manner.

Apparatus for conducting the process of the invention may be any suitable vessel permitting the transfer of liquids and solids. Particularly advantageous in the performance of the leaching step is the use of counter current extraction apparatus.

A process in accordance with this invention may be performed as follows:

Clarifier sludge and saturator sludge from a mercury cathode brine electrolysis cell are combined and acidified with hydrochloric acid to a pH of 2.0. The acidified sludge is allowed to set for 8 hours and then washed with water. Thereafter, the washed sludge is leached with 50 times its volume of 15 weight percent sodium hypochlorite. The sludge solids are periodically sampled and analyzed for mercury content.

The hypochlorite solvent contacted with the sludge is treated with sufficient sodium hydroxide to precipitate contained mercury as mercuric oxide. The mercuric oxide precipitate is recovered by filtering from the leachate and roasted to release metallic mercury. The metallic mercury is returned to the cathode section of the brine electrolysis cell apparatus. The foregoing procedure can be repeated on a continuous basis. Mercury depleted sludge solids are disposed of as landfill.

The following examples illustrate the advantages accruing from the practice of the invention.

EXAMPLE I

This example illustrates the removal of mercury from electrolysis cell brine sludge by the process of this invention.

One hundred grams of wet cake containing 24.3 parts per million by weight of mercury was prepared from the vacuum filtration of saturator sludge. This wet cake was reconstituted with 100 ml. of clarifier brine containing 2.8 ppm. of mercury. The resultant sludge slurry was placed in a beaker and a small quantity of concentrated hydrochloric acid added until a pH of 2.0 was obtained. The slurry was then stirred for two hours.

The acidified sludge slurry was vacuum filtered, and the sludge wet cake residue washed with water. The mercury content of the wet cake after the acidification and washing treatment was 12.4 ppm. mercury.

Thereafter, 50 grams of the acidified and washed wet cake was leached with 100 milliliters of 5 percent by weight sodium hypochlorite aqueous solution (adjusted to pH 7) for a period of 2–3 hours with stirring.

The hypochlorite leachate was withdrawn from the sludge by vacuum filtration and the resultant filter cake washed with water. The filtered sludge wet filter cake contained 0.39 ppm. mercury.

EXAMPLE II

This example illustrates the removal of mercury from saturator sludge by acid treatment alone.

Part A. The sludge of Example I was treated with a large excess of concentrated hydrochloric acid for 2–3 hours. The mercury content decreased from 24.3 parts per million to 1.07 part per million (wet cake basis).

Part B. A further treatment of the sludge solids of Part A with concentrated nitric acid (70 percent by weight) reduced the mercury content to 0.06 part per million.

Part C. Saturator sludge of Example I was treated with nitric acid by taking 20 grams of wet sludge solids and stirring in a beaker with 100 milliliters of various concentrations of nitric acid for 2–3 hours. After nitric acid treatment, the samples were filtered, and the filtered residue was washed and analyzed. Results are set out in Table I.

TABLE I

| Cell Sludge $HNO_3$ Conc. Wt. (%) | Leaching with Nitric Acid ppm. Hg. (Wet Solids) |
|---|---|
| 5 | 18.0 |
| 10 | 13.4 |
| 20 | 2.5 |

EXAMPLE III

This example illustrates the removal of mercury from clarifier sludge by acid treatment alone.

Clarifier sludge was treated with concentrated hydrochloric acid to a pH of 4. Half of the sludge solids went into solution as a result of acidification. The undissolved sludge solids were recovered by filtration and the filtered cake washed with water. The mercury content of the resultant filter cake was 26 parts per million (wet cake basis).

EXAMPLE IV

This example illustrates the removal of mercury from clarifier sludge by hypochlorite leaching alone. One hundred grams of wet clarifier sludge was suspended in 2 liters of 5 percent sodium hypochlorite solution with stirring for various lengths of time. The leached sludge was filtered and washed with water. Experimental conditions and results are shown in Table II below.

TABLE II

| Run No. | pH | ppm. Hg. in Filter Wet Cake After | |
|---|---|---|---|
| | | 2 Hours | 24 Hours |
| 1 | 7 | 1.7 | 1.4 |
| 2 | 11 | 4.5 | 3.7 |

EXAMPLE V

This example illustrates the leaching of saturator sludge with hypochlorite solvent alone.

Saturator sludge was subjected to multistage hypochlorite leaching by the following procedure:

About 600 grams of wet saturator sludge were placed in a glass beaker and leached by stirring with 5 percent sodium hypochlorite on a 1:1 volume basis for one hour. Thereafter, the sludge was filtered, washed, and the filter cake again leached with the same volume of hypochlorite solution. This leaching was repeated three times. In each leaching the pH of the sodium hypochlorite, initially 11, was adjusted to a pH of 8. The results of the sequential hypochlorite leach are shown in Table III below.

TABLE III

MERCURY REMOVAL BY MULTI-STAGE LEACHING WITH SODIUM HYPOCHLORITE

| Stage | pH Start | → 1 hr. | % Avail. $Cl_2$ Start | → 1 hr. | ppm Hg. (Wet Filt. Cake) |
|---|---|---|---|---|---|
| 1 | 7.8 | 7.2 | 3.0 | 1.3 | 4.4 |
| 2 | 7.9 | 6.5 | 5.7 | 1.8 | 3.2 |
| 3 | 7.9 | 6.0 | 6.2 | 2.0 | 1.5 |
| 4 | 7.8 | 6.9 | 5.5 | 1.4 | 1.6 |

INTERPRETATION OF EXAMPLES

Example I shows that mercury content of saturator is reduced below 0.75 part per million on a wet cake basis when a two-step operation involving (1) acidification and (2) hypochlorite leaching is used. Examples II and III show that acid leaching alone is not sufficient to remove mercury below the level of 0.75 part per million on a wet cake basis unless very severe and corrosive conditions (e.g., 70 percent nitric acid in extreme excess) are employed.

Example IV and Example V show that hypochlorite leaching alone or repeated hypochlorite leaching is not effective in removing mercury below concentrations of 0.75 part per million (on a wet cake basis).

Although the invention has been described with reference to particular specific details and certain preferred exemplifications thereof, it is not intended to thereby limit the scope of this invention except insofar as the details are recited in the appended claims.

What is claimed is:

1. A process for reducing the mercury content of mercury cathode brine electrolysis cell sludge containing minor concentrations of mercury by sequentially: (1) acidifying said sludge to a pH below 2.5, and (2) leaching said sludge with aqueous hypochlorite solvent of a pH above 5 until the mercury content is less than 0.75 part per million by weight based on the weight of sludge wet cake after leaching.

2. The process of claim 1 wherein the initial mercury content of the sludge wet cake is between 10 to 100 parts per million by weight based on the weight of sludge wet cake before acidifying.

3. The process of claim 1 wherein the sludge is acidified to a pH between zero and 2.2.

4. The process of claim 1 wherein the sludge is acidified with hydrochloric acid.

5. The process of claim 1 wherein the pH of the aqueous hypochlorite solvent is between 6 to 8.

6. The process of claim 1 wherein hypochlorous acid, sodium hypochlorite, calcium hypochlorite, or mixtures thereof constitute the major source of hypochlorite in the aqueous hypochlorite solvent.

7. The process of claim 1 wherein the sludge comprises saturator sludge or clarifier sludge.

8. The process of claim 1 wherein said cell sludge consists of saturator sludge.

9. A process for recovering and concentrating the mercury content of mercury cathode brine electrolysis cell sludge containing minor concentrations of mercury by sequentially: (1) acidifying said sludge to a pH below 2.5, (2) leaching said sludge with aqueous hypochlorite solvent at a pH above 5, (3) separating said solvent from the leached sludge, and (4) isolating the major part of the mercury content of said separated solvent.

10. The process of claim 9 wherein the initial mercury content of the sludge is between 10 to 100 parts per million by weight based on weight of sludge wet cake before acidifying.

11. The process of claim 9 wherein the sludge is acidified to a pH between 1.0 and 2.2.

12. The process of claim 9 wherein the sludge is acidified with hydrochloric acid.

13. The process of claim 9 wherein the pH of the aqueous hypochlorite solvent is betweeen 6 to 8.

14. The process of claim 9 wherein hypochlorous acid, sodium hypochlorite, calcium hypochlorite, or mixtures thereof constitute the major source of hypochlorite in the aqueous hypochlorite solvent.

15. The process of claim 9 wherein the sludge comprises saturator sludge or clarifier sludge.

16. The process of claim 9 wherein the mercury content of the separated solvent is isolated by ion exchange, sorption, electrolytic deposition, metal replacement, amalgamation, oxidation, or sulfidation.

17. The process of claim 9 wherein the mercury content of the separated solvent is isolated by ion exchange, sorption, electrolytic deposition, metal replacement, amalgamation or oxidation.

18. In an improved process for making elemental chlorine and sodium-mercury amalgam by the electrolysis of brine in a mercury cathode electrolysis cell wherein depleted brine from said cell is treated with alkali-metal carbonate or alkali-metal hydroxide to precipitate impurities as clarifier sludge, said sludge containing minor concentrations of mercury, separating said sludge from said brine for disposal outside the cell, and adding to the electrolysis cell metallic mercury in amount at least equal to the mercury retained by said separated clarifier sludge; the improvement which comprises:

recovering the mercury content of said sludge by sequentially: (1) acidifying said sludge with hydrochloric acid to a pH below 2.5, (2) leaching said sludge with aqueous hypochlorite solvent at a pH above 5, (3) separating said solvent from the leached sludge, (4) isolating the major part of the mercury content of said separated solvent, (5) converting the insolubilized mercury to metallic mercury or chloride of mercury, and (6) returning said metallic mercury to a cathode of a mercury cathode brine electrolysis cell.

19. In an improved process for making elemental chlorine and sodium-mercury amalgam by the electrolysis of brine in a mercury cathode electrolysis cell wherein depleted brine is reconcentrated by contact with solid sodium chloride and returned to said electrolysis cell, said contact with sodium chloride resulting in the accumulation of insoluble impurities as saturator sludge, said sludge containing minor concentrations of mercury, separating said sludge from said brine for disposal outside the cell, and adding to the electrolysis cell metallic mercury in amount at least equal to the mercury retained by said saturator sludge; the improvement which comprises:

recovering the mercury content of said sludge by sequentially: (1) acidifying said sludge with hydrochloric acid to a pH below 2.5, (2) leaching said sludge with aqueous hypochlorite solvent at a pH above 5, (3) separating said solvent from the leached sludge, (4) isolating the major part of the mercury content of said separated solvent, (5) converting the insolubilized mercury to metallic mercury or chloride of mercury, and (6) returning said metallic mercury to a cathode of a mercury cathode brine electrolysis cell.

* * * * *